No. 748,793. PATENTED JAN. 5, 1904.
A. C. ROGERS.
METAL TRACTION WHEEL.
APPLICATION FILED MAY 18, 1903.
NO MODEL.
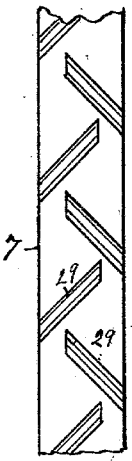
Fig. 4.
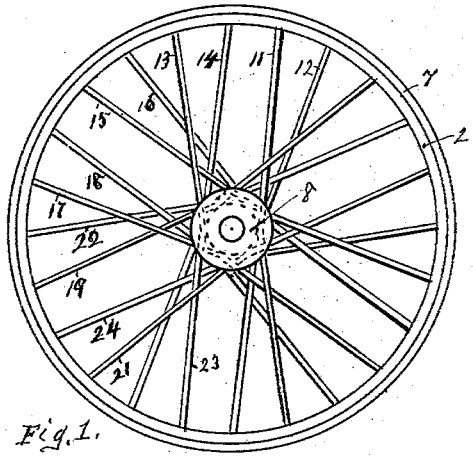
Fig. 1.
Fig. 2.
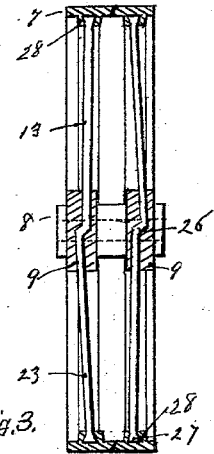
Fig. 3.
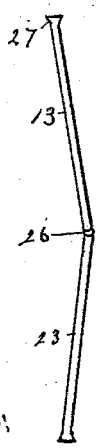
Fig. 5.
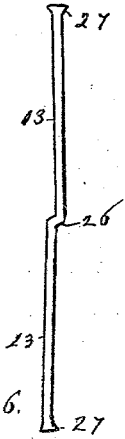
Fig. 6.
WITNESSES,
Samuel S. Carr,
Nelle E. Carr,
Alonzo C. Rogers, INVENTOR,
By Robert S. Carr,
Atty.

No. 748,793. Patented January 5, 1904.

UNITED STATES PATENT OFFICE.

ALONZO C. ROGERS, OF TOLEDO, OHIO.

METAL TRACTION-WHEEL.

SPECIFICATION forming part of Letters Patent No. 748,793, dated January 5, 1904.

Application filed May 18, 1903. Serial No. 157,541. (No model.)

*To all whom it may concern:*

Be it known that I, ALONZO C. ROGERS, a citizen of the United States, residing at Toledo, Ohio, have invented a new and useful Improvement in Metal Traction-Wheels, of which the following is a specification.

My invention relates to metal traction-wheels of the class adapted to use on traction-engines and elsewhere; and the objects of my improvement are to secure the spokes tangent to the hub and as chords to the rim to prevent any torsional movement of the hub and rim in relation to each other; to form two spokes of a single metal rod, with an offset in its middle portion sufficient to shift the base of contiguous spokes laterally to different planes to permit adjacent spokes to be extended in a straight line diagonally across and substantially in contact with each other and terminate at the rim in the same plane. Said offset also serves to more permanently secure the spokes in the hub when it is cast thereon. These objects are attained in the following-described manner, as illustrated in the accompanying drawings, in which—

Figure 1 is an end elevation of a wheel embodying my improvement; Fig. 2, an end elevation with the hub in section and showing only the spokes leading from one end of the hub; Fig. 3, a transverse section of Fig. 1; Fig. 4, a portion of the face or tread of the wheel, showing a preferable arrangement of the cleats; and Figs. 5 and 6 front and side views, respectively, of a spoke and its integral complement.

In the drawings, 7 represents the rim, and 8 the hub, of the wheel, which is found with a collar 9 near each of its ends. Spokes 11, 13, 15, 17, 19, and 21 are cast in one of the collars, and spokes 12, 14, 16, 18, 22, and 24 are cast in the other. Each spoke is formed double or integral with its complementary spoke, as 13 with 23. A lateral offset 26 is formed by a double bend in the rod between the inner ends of the spokes and in the middle portion of the metal rod of which they consist. This offset is of sufficient extent to displace laterally the contiguous inner ends or bases of corresponding spokes and permit them to be extended in a straight line across adjacent spokes and terminate in enlarged ends 27 in the same plane at the rim and wherein they are secured by having the rim cast on them. The enlarged or swaged ends and the offsets cause the spokes to be held securely in the rim and in the hub that is cast on them. Before being secured in the hub or the rim the spokes are deflected by proper bends at their offset to fit them to the proper-sized rims and hubs for which they are intended, as shown in Figs. 5 and 6. In placing the spokes in the proper position for being cast in the hub and the rim they are woven together, as shown in Fig. 2, wherein spoke 13 is extended over the base portions of spokes 15 and 19 and its complement 23 is extended under the base portions of spokes 17 and 21. All the spokes that radiate from each end of the hub are placed in a similar position in relation to each other that they may not be deflected out of a straight line between the hub and rim and be more efficient in supplementing the tensile strain of the spokes diametrically opposite. Each spoke and its integral complement form a continuous tangent to the hub and a chord to the rim, whereby the strongest possible construction is obtained. The spokes are placed in the flanges of the hub as far as possible from its axial line and tangent thereto that all torsional movement of the rim in relation to the hub may be prevented when power is applied to the hub in any ordinary manner, as by sprocket-wheel and chain, gear-wheels, or by the hub being securely fastened on a driven axle. The rim is reinforced on its inner surface by integral rings 28 or bosses (not shown) being raised thereon near its edges and wherein the spokes from the respective ends of the hub terminate and are secured. Cleats 29 are preferably secured to the face or tread of the wheel-rim in a zigzag manner or diagonal to its length, and they alternately extend from its respective edges and terminate near the succeeding cleat about midway beyond the center line of the rim and its opposite edge, as shown in Fig. 4. This arrangement of the cleats causes the wheel to run smoothly and with little jolting on smooth hard surfaces. The rim is braced or maintained in the plane perpendicular to the axis of the hub by a slight convergence of the spokes thereto from the respective ends of the hubs, and the spokes from one end of the wheel-hub terminate at the rim alternately with those from the other and at uniform distance apart around the inside of the rim. When the wheel is completed, it is extremely strong and durable, as its parts are substantially integral by being cast together.

Having described my improvement, what I claim as my invention, and desire to secure by Letters Patent of the United States, is—

1. As a new article of manufacture, two spokes formed of a single metal rod and having their inner contiguous ends displaced laterally by a double bend in the middle portion of the rod and terminating in substantially opposite directions in enlarged extremities.

2. In a metal traction-wheel the combination with a hub formed with end flanges, and a rim, of a spoke and its complement formed of a single rod with a double bend in its middle portion whereon the hub-flange is securely cast, and with enlarged extremities whereon the rim is securely cast, said spoke and complement together being so arranged as to form a chord to the rim and a tangent to the hub, and whereby an integral wheel is formed.

3. In a metal traction-wheel, the combination with a rim, of a series of metal rods each forming a main and a complementary spoke and having a double bend in its middle portion to displace the contiguous base portions of said spokes in different planes, said rods being extended across each other in straight lines from said double bends to form tangents to the hub and chords to the rim and terminating at their extremities in enlargements having the rim securely cast thereon, and a hub cast upon the middle portion of said rods and over said bends therein.

4. In a traction-wheel, the combination with a cast-metal hub formed with thick flanges encircling its respective end portions, and a cast-metal rim formed with parallel flanges on its inner surface which correspond with the respective hub-flanges and are concentric thereto, of metal rods each formed into two opposite spokes by means of a double bend in its middle portion, whereby the base portions of said spokes are displaced in different planes parallel to the hub-flanges, said hub-flanges being cast securely over the said double bend and middle portion of the rods and in such manner that the opposite spokes together form a tangent to the hub and a chord to the rim, said spokes being extended from the face of the hub-flanges across adjacent spokes and terminating within the corresponding rim-flanges which are securely cast thereon, whereby a substantially integral wheel is formed.

ALONZO C. ROGERS.

Witnesses:
DANIEL H. JAMES,
THOS. R. WICKENDEN.